United States Patent
Rougier

(10) Patent No.: US 10,049,088 B1
(45) Date of Patent: Aug. 14, 2018

(54) AUTOMATED CONFIGURATION SYSTEM FOR COMPLEX SYSTEM REQUIRING EXHAUSTIVE CUSTOM PROGRAMMING

(71) Applicant: Kirio Inc., Lynnwood, WA (US)

(72) Inventor: Franck D Rougier, Seattle, WA (US)

(73) Assignee: Kirio Inc., Lynnwood, WA (US)

( * ) Notice: Subject to any disclaimer, the term of this patent is extended or adjusted under 35 U.S.C. 154(b) by 0 days.

(21) Appl. No.: 15/606,873

(22) Filed: May 26, 2017

Related U.S. Application Data

(60) Provisional application No. 62/342,053, filed on May 26, 2016.

(51) Int. Cl.
| | |
|---|---|
| *H04L 29/06* | (2006.01) |
| *H04L 29/08* | (2006.01) |
| *G06F 17/30* | (2006.01) |
| *G06F 17/22* | (2006.01) |
| *G06Q 10/06* | (2012.01) |

(52) U.S. Cl.
CPC .... *G06F 17/2241* (2013.01); *G06F 17/30038* (2013.01); *G06Q 10/063118* (2013.01)

(58) Field of Classification Search
CPC ............... G06Q 10/06; G06F 17/2241; G06F 17/30038; G06F 17/30241; G06F 17/30395; G06F 17/30398; H04L 67/12; H04L 63/20; G05B 15/02
See application file for complete search history.

(56) References Cited

U.S. PATENT DOCUMENTS

| | | | | |
|---|---|---|---|---|
| 8,417,481 | B2 * | 4/2013 | Cook | G05B 15/02 |
| | | | | 702/181 |
| 9,128,472 | B2 * | 9/2015 | Lawson | G05B 19/4185 |
| 9,264,252 | B2 * | 2/2016 | Ebrom | D06F 39/005 |
| 9,451,573 | B2 * | 9/2016 | Erickson | H04W 76/10 |
| 9,614,690 | B2 * | 4/2017 | Ehsani | G10L 21/06 |
| 9,704,113 | B2 * | 7/2017 | Spencer | G06Q 10/06 |
| 2017/0097619 | A1 * | 4/2017 | Welingkar | G05B 15/02 |

OTHER PUBLICATIONS

Rotondi et al., Managing access control for things: a capability based approach, Feb. 2012, 6 pages.*
Englert et al., How to auto-configure your smart home?: high-resolution power measurements to the rescue, May 2013, 10 pages.*
Dhungana et al., Smart factory product lines: a configuration perspective on smart production ecosystems, Jul. 2015, 10 pages.*

* cited by examiner

*Primary Examiner* — Thuy Dao
(74) *Attorney, Agent, or Firm* — FSP LLC

(57) ABSTRACT

A controller is configured with a description of a building automation project, including attributes of the structure itself as well as the locations and configurations of the devices. The controller generates the appropriate schema in a control memory structure, and links it to an environment controller. The controller then generates a set of instructions for system installation and preconfigures the environment controller with the project attributes and sets the environment controller up for interaction with the devices.

10 Claims, 13 Drawing Sheets

US 10,049,088 B1

AUTOMATED CONFIGURATION SYSTEM FOR COMPLEX SYSTEM REQUIRING EXHAUSTIVE CUSTOM PROGRAMMING

CROSS-REFERENCE TO RELATED APPLICATIONS

This application claims benefit under 35 U.S.C. 119 to U.S. application Ser. No. 62/342,053, filed on May 26, 2016, and incorporated herein by reference in its entirety.

BACKGROUND

The complexity and limited setup functionality of building automation projects often necessitate extensive work by trained experts in order to install and set up the systems. A typical building automation system takes three to four days to be installed, programmed and commissioned. This greatly increases the time and expense of building automation projects. These projects take this long, in part, because the installer must manually write out any installation and wiring diagrams and bills of materials for the project. Further, under current methods the environment controller must be manually programmed with each of the individual devices and then it must be further programmed to make these devices work together, and to test them properly. Further, control interface design and setup is divorced from the setup of the automation system itself. Control interface design and setup may require separate expert technicians to construct a custom user interface to allow the user to operate the system, or the user may have to use several different interfaces to operate different devices within the system. This also increases the possibility of errors which can make this process even more costly.

Current implementations of control systems lack inherent context about the devices which they control, which must be provided by the installer when installing and programming a system. Automation systems are also limited to what linkages are provided by the user, and currently lack the capability to infer context from device location and other parameters. Current methods can capture system requirements and specifications in a form, however, this information is not put to use to generate device programming, to aid in the installation process or facilitate end-user interaction with the system. Basically, current practices rely on experts to design, build, install and commission computerized control, or any Supervisory Control and Data Acquisition (SCADA) systems based almost entirely on a textual description.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
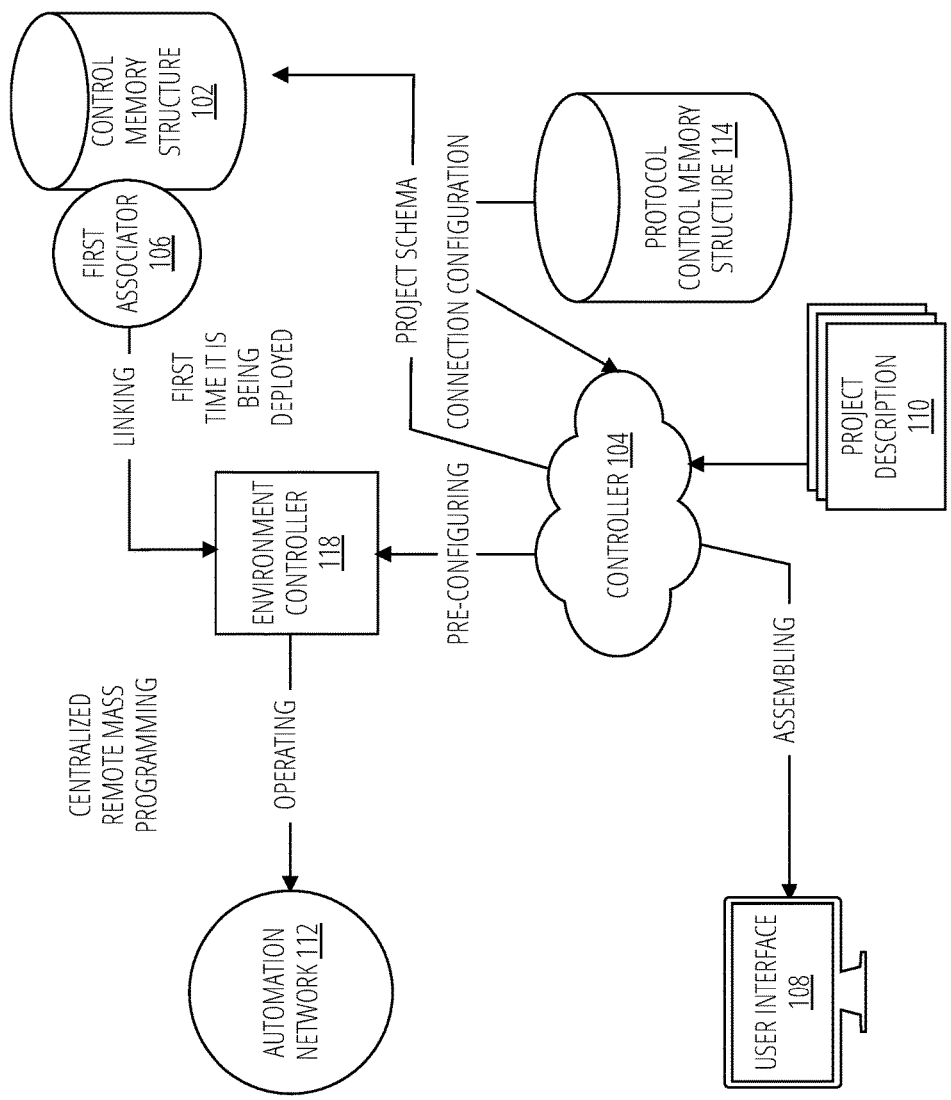
FIG. 1 illustrates an embodiment of a system for configuring an environmental controller 100.

Terminology used herein has its conventional meaning in the art unless otherwise indicated below.

"Automation" in this context refers to generic real-world device capabilities which are subject to external control or state retrieval. For example, in the "lightbulb" family of devices, the "best" abstract lightbulb may have the following capabilities: power on/off, dimming, power usage and color changing. Each of these attributes are the automations related to a lightbulb. Subsequent lightbulbs may implement a subset of the aforementioned automations.

"Automation map" in this context refers to The map between a given device and an automation and its specific implementation in a protocol. Example: ON_OFF<->Leviton Toggle Switch<->SWITCH_BINARY "Automation network" in this context refers to a collection of networked devices and appliances for monitoring and controlling functions in a building using a central controller "Interface constructor" in this context refers to logic to assemble components interface components into a custom user interface based.

"Protocol" in this context refers to A communication system defined by a set of rules and regulation which determines how information is transmitted between 2 or more entities. This protocol is assumed to be implemented in either hardware, software or a combination of both. A protocol requires a physical medium (Physical Layer) to move small amount of information (data) Example: Z-WAVE "Protocol configuration" in this context refers to a universal protocol configuration allowing configuration of any protocol parameters at any level (system, physical layer, command, command parameter, units, default values etc.) for examplexample: ZWAVE command SWITCH_BINARY for on off switch action. ZWAVE system_parameter PORT for physical communication port where the ZWAVE device is located (e.g. ttyS1)

"Connection parameters" in this context refers to specifying communication template, driver and protocol a communication protocol which identifies the requirements for communication with a device. For example, a device may specify that it may communicate utilizing RS232, RS485, USB, or wirelessly Zigbee, 6LoWPAN, Z-Wave. A protocol constraint may also be specified in an associative manner, by specifying the device type or model, where a known protocol is used for that device. For example, an Acme Fan Co model C-04te is listed as utilizing Zigbee within the control memory structure of the system, so specifying Acme Fan Co model C-04te may be used as a protocol constraint.

"Protocol selector" in this context refers to logic to select the proper protocols and drivers necessary to communicate with each device in an automation network {for each protocolConstraint in deviceList{retrieve protocol} associate protocol property with device output: protocolConfiguration{bedroomFan: zigbee; thermostat: RS485; . . . }}

Embodiments of a system and process are disclosed by which a home builder or architect describes a house or building projects using a novel nomenclature inside a web-based application form. This information is then paired from a database of systems which may be automated. This database has a generic description of automation capabilities for families of devices irrespective of manufacturer or protocols. After the builder, homeowner or technician describes the project and its main components, the system is able to generate all user interface elements, testing, control algorithms, installation details (wiring, scheduling . . . ) with no human interaction. Applying this information and a novel classification system, a non-expert can install and commission a complex system more quickly. Typical building automation systems take three to four days to be installed, programmed and commissioned. The system provides increased setup functionality for automation systems, allowing the installation of automation systems to be done by a regular installer in substantially less time.

The system and process enable a descriptive and collaborative process whereby key information concerning which systems are to be installed, what, where, and how many, are captured in a database. Using this information and a novel classification system, allows a non-expert to be assisted in installing and commissioning a complex system very quickly. Within the scope of control systems aimed at maintaining human comfort, security, and convenience in dwellings, the textual description of a project is now used dynamically and automatically to generate a solution. This allows home automation to move from custom, expensive and time-consuming process to repeatable, mass-market and less expensive installations. It also moves the process from experts to regularly trained installers.

A building project may be described with the system, and the user may specify the project topology and select the devices to perform a given set of functions and associate those devices with different areas within the project. Devices may be templatized and available in a database, so that the user may select from available devices, or the user may select a generic device template and add a new device to the database. The device templates may begin as a model for a generic device of a given type and then the user may add features and functions (automations) to the device to customize the template to mirror the real world device. Device automations specified by the user within the template relate the available automations of that device controllable by within a device's protocol. A device's protocol specifies the way in which that device may communicate with other devices, or controllers. For example, a protocol may specify a command list for available functions, and specifications for signal and character encoding.

The user may manually map commands to an automation, or in some instances, this may already be configured. For example, an HVAC system may have a "bypass" automation, so the user would be able to select which command within the device's protocol to associate with that automation, or, a device may only be able to turn off and on, so it may contain an on-off automation, which may be mapped to the device's associated protocol as a "1" for on, and a "0" for off. For each real world device, there is a description for each state a device may be in, so a light switch which has dimming functionality, as well as "on-off" functionality may be configured properly to utilize each state. A database is setup for each state that the device may be in so that information may be persisted. For example, a light which may be dimmed based on a percentage may have 101 states: on (100%), off, and each of the interim states.

The device itself may be part of a larger class of devices on which the system may implement a matrix of other devices so that device automations may be coordinated. The automations may be associated with other automations based on the result (what the device does) and not with how the automation is performed (using a specific protocol), or which type of device performs it. The possible usages and relationships between devices may also be analyzed by the system and then the system may suggest to the installer that to create an association between the different devices. For example, the system may ask if the user would like to relate a thermostat, a heater and an AC unit together to create a heating control and then the system may store that information. The system may also store and read the available values provided by a device and may also store "virtual values" which may be calculated based on actual values read. For example, a device may give amperage and voltage, but not power, so the system may establish the power utilized by the device in watts as a virtual value calculated from the values read from the device.

The system provides an interface for the input of semantic information to describe a building project's topology. The user may input known building information, for example, information on the construction, location, dimensions, airflow, window square footage, room orientation, building standard (for example, if the building is a "green" building), or other known information about the building. The system may then group rooms as nodes and edges, to give the system context as to the proximity and relation of rooms to one another, these nodes may be further grouped into units, units may have unit areas within them, an example of a unit area may be a kitchen.

Unit aliases may be used to give the system context for a given area which might be identified differently by the builder or resident. For example, a room might be referred to as a "galley" in the building plans or by the builder or owner, the system would normally not have context for what this colloquial name might be. However, the system allows for tagging any room unit following formalized aliases like "kitchen" which would give the system context to apply known attributes to rooms that correspond to kitchens. This may include information about the heating, cooling and ventilation requirements of such spaces like kitchen as specified by the locale building codes. Additionally, this would allow the system to associate that room as a kitchen and apply kitchen-specific algorithms to it. For example, if the user would like the kitchen lights to change to a specific setting and the oven to preheat when they arrive home.

If the house is wired for an environmental controller this information may be added to the semantic information, and the controller would privilege wired over wireless systems during setup. During the configuration process, the user may select the types of devices which will be in each room and may further specify the specific a specific brand, manufacturer or protocol. For example, the user may select an HVAC system, and then specify the type, make, model, the device scope (security, etc), orientation and installation location of the device. The system may also check the maximum number of supported devices for each connection type and then will generate an alert that another controller should be added to the building if that number exceeds the maximum number allowable, this may be determined by limitations of the hardware, ports or protocols. Using the information supplied by the user and the control objective, the system generates instructions for wiring and actual installation of a controller based on the selected devices and their locations, orientations and mode of connection (wired, wifi, etc.).

The system may calculate the voltage, impedance, capacitance and allowable length and gauges of the wires for each connection. If the distance between the controller and a wired device is too great for a given protocol, the system may generate an alert that the device needs to be moved closer to the controller, another controller needs to be used, or another means of connection should be employed (i.e. a repeater, a switch). When the installation and pre-configuration is complete, the system may then connect with the controller, and configure the controller with the settings specified in the pre-configuration, downloading the appropriate drivers and software and other configurations, the system may then place the device in testing mode so that the user may test the connections to ensure that the setup is working properly, the system may also walk the user through the pairing of any wireless devices. The user interface may list all the available automations for each of the devices so that the installer may check to ensure that each device is working properly. The system assembles a control user interface for the operation of the installed devices based on the information from each of the devices.

The system may use automatically generated labels, icons based on the aliases, device families, units of measurements and mapping function required by some devices. For example, in order to avoid decimal points, many devices multiply their internal temperature measurements by the number ten (10), such that 23.5 degrees Celsius is internally represented as 235. Conversely, any temperature commands sent by the user would need to comply with this nomenclature. As such, a new set point of 24.5 would need be sent as 245. The system generates this mapping automatically based on the device requirements in both directions. The automation description may contain information about how the control for that automation should be rendered on a user interface, for example, the system may render every on-off automation on a user interface as a skeuomorphic toggle switch.

The controls for devices for each type may look the same so that there is consistency across devices irrespective of manufacturer, protocol, device make and model. That is, the control for any light bulb with various capabilities may be shown in a consistent and expected way. In addition to the user interface automatic generation, a database schema to store commanded user actions and retrieved automation states is created with the appropriate rule for efficient data storage based on the kind of automation.

The system discriminates and abstracts real world values of automations related to a switch (all settable binary states), contact (all gettable binary states), color, date and time, set-points, strings etc. Using these internal data types, an appropriate storage method is created by the system to be used by the controller. The system may generate storage strategies based on differential, timed or percentage changes. Anticipating what the system needs to store allows the disk space to be more efficiently used based on the automation and maximized for long term data retention.

When the user commissions the actual controller for a given project as described earlier, the user may enter reference information relating to the controller (serial number, special codes). The controller may requests its configuration settings from the system by presenting a reference number. On a match, the system generates all the controller settings and configurations as described in the project for the specific home wired and wireless devices. By way of example the device may create all the device automations, grouping, rooms, labels, mapping, built-in efficiency algorithm for managing all devices, the original user profile for end user access, the database for storing all activity on the sensor, device and user networks, the user interface element and a description on how to display the home on a mobile device. Further, based on the protocol or manufacturer devices, a specific 1-time configuration user interface may be presented to the end user's mobile application.

The system may implement standard project management features such as calendaring, Gantt charting, reminders and alerts using e-mail, telephone, and other relevant communication channels. Once the controller is configured, the system may act as a client to test the project setup and ensure that everything is properly labeled and working as it should. If not, the user is able to make live changes to the project to regenerate the set of configuration documents and send them to the controller once more.

FIG. 1 illustrates an embodiment of system for configuring an environmental controller 100 comprises protocol control memory structure 114, automation network 112, environment controller 118, first associator 106, control memory structure 102, controller 104, user interface 108, and project description 110.

The protocol control memory structure 114 may contain protocols for a variety of devices from different manufacturers. The schema for the protocol control memory structure 114 may be defined to classify the devices or manufacturers and the functionality of the the virtual device and what proper commands are for each given virtual device function.

The environment controller 118 may be a computing virtual device which is configured to operate devices within an automation network. The environment controller 118 prior to being activated the first time may contain no information about devices, location or protocols and may acquire that information during the pre-configuring process.

The controller 104 may receive a protocol configuration from the protocol control memory structure 114 based on the devices specified at the user interface 108. The controller 104 recieves a project description 110 from the user interface 108 and creates a project schema.

The project description 110 may include descriptions of the location of the automation network 112 as well as the environment controller 118.

The system for configuring an environmental controller 100 may be operated in accordance with the processes outlined in FIG. 2, FIG. 3, FIG. 4, and FIG. 5.

Figure 2:
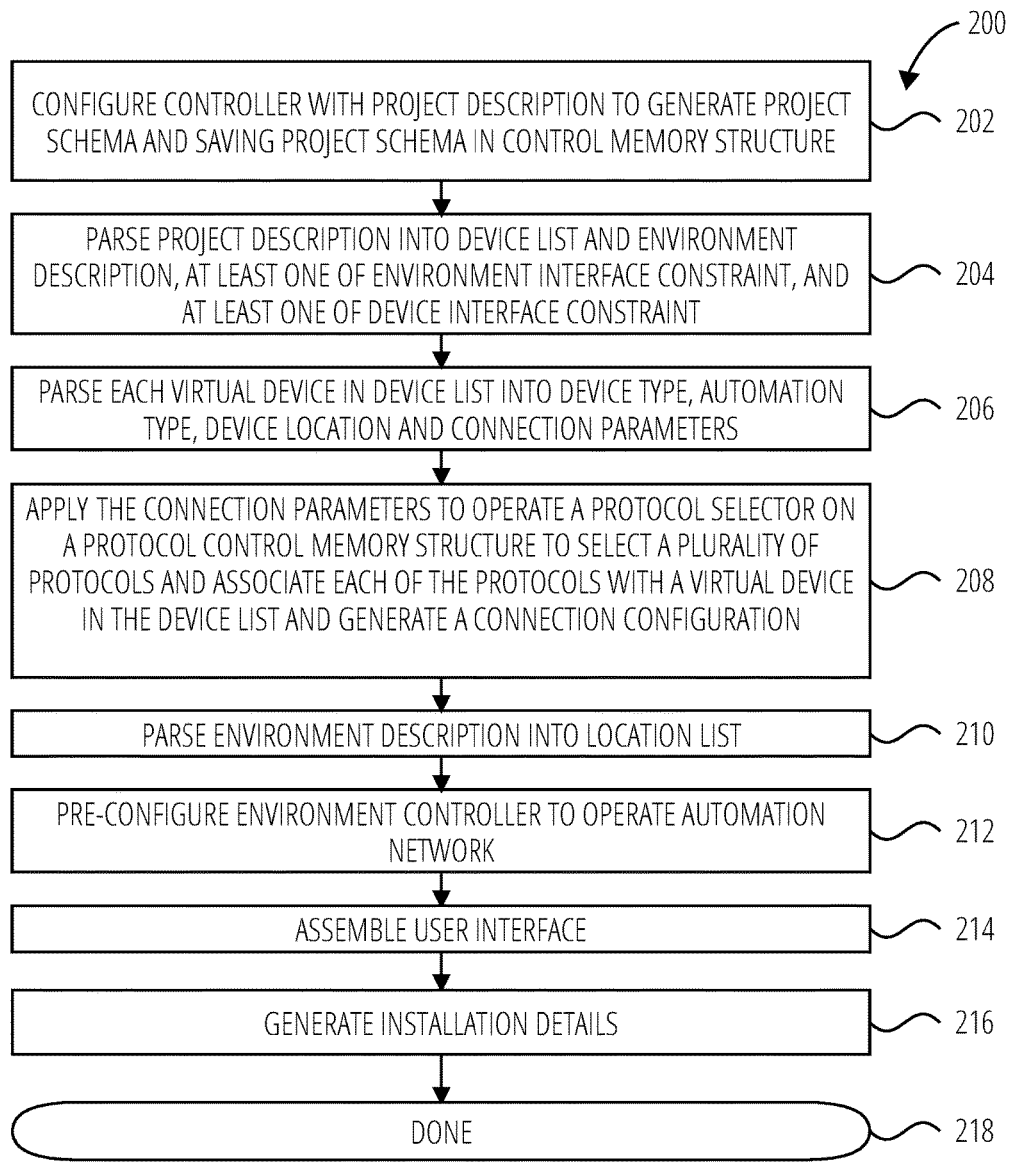
FIG. 2 illustrates an embodiment of a process for configuring an environment controller 200

FIG. 2 illustrates an embodiment of a process for configuring an environment controller 200. In block 202, process for configuring an environment controller 200 configures a controller with a project description to generate a project schema and saving the project schema in a control memory structure. In block 204, process for configuring an environment controller 200 parses the project description into a device list and an environment description, at least one of an environment interface constraint, and at least one of a device interface constraint. In block 206, process for configuring an environment controller 200 parses each virtual device in the device list into a device type, automation type, device location and connection parameters. In block 208, process for configuring an environment controller 200 applies the connection parameters to operate a protocol selector on a protocol control memory structure to select a plurality of protocols and associate each of the protocols with a virtual device in the device list and generate a connection configuration. In block 210, process for configuring an environment controller 200 parses the environment description into a location list. In process to pre-configure environment controller to operate automation network 212, process for configuring an environment controller 200 pre-configures an environment controller to operate an automation network. In process for assembling a user interface 214, process for configuring an environment controller 200 assembles a user interface. In process for generating installation details 216, process for configuring an environment controller 200 generates installation details. In done block 218, process for configuring an environment controller 200 ends.

A method may include configuring a controller with a project description to generate a project schema and saving the project schema in a control memory structure; parsing the project description into a device list and an environment description, at least one of an environment interface constraint, and at least one of a device interface constraint; parsing each virtual device in the device list into a device type, automation type, device location and connection parameters; applying the connection parameters to operate a protocol selector on a protocol control memory structure to select a group of protocols and associate each of the protocols with a virtual device in the device list and generate a connection configuration; parsing the environment description into a location list; pre-configuring an environment controller to operate an automation network; assembling a user interface; generating installation details; and/or applying a control interface detail list to the interface constructor to generate a control interface. Parsing the environment description into a location list may include a group of environment locations. Pre-configuring an environment controller to operate an automation network may include operating a first associator to link the environment controller with the project schema in the control memory structure; applying the connection configuration to a configuration engine to generate a communication schema; and/or applying the automation type, the device type, the location list and the communication schema to a second associator to create a device-environment configuration. Assembling a user interface may include retrieving, for each virtual device in the device list, at least one of the environment interface constraints and at least one of the virtual device interface constraints; generating an interface requirement from the at least one of the environment interface constraints and at least one of the virtual device interface constraints; applying the interface requirement to operate a selector on the control memory structure to retrieve a group of interface components; and/or applying the group of interface components to an interface constructor to assemble the user interface. Generating installation details may include configuring an instruction assembler with the environment description and the device list to generate an assembly packet and the installation details. The method for pre-configuring the environment controller may further include executing initial tests of connected devices. The project description may include, at least one of: building location, building configuration, devices used, and/or device attributes. Generating the assembly packet and the installation details may further include, at least one of: querying an environment controller specification list with the project description to select the environment controller and/or applying environment controller attributes and device attributes list to a project schematic, electrical maps and a materials list. Generating an environment description may include generating an environment configuration and environment attributes.

The process for configuring an environment controller 200 improves the efficiency of the machine by allowing a user to preconfigure an environment controller and automatically generate instructions for installation, the user does not have to repetitively program the controller with each individual virtual device and configuration. This allows the system to conserve resources.

Figure 3:
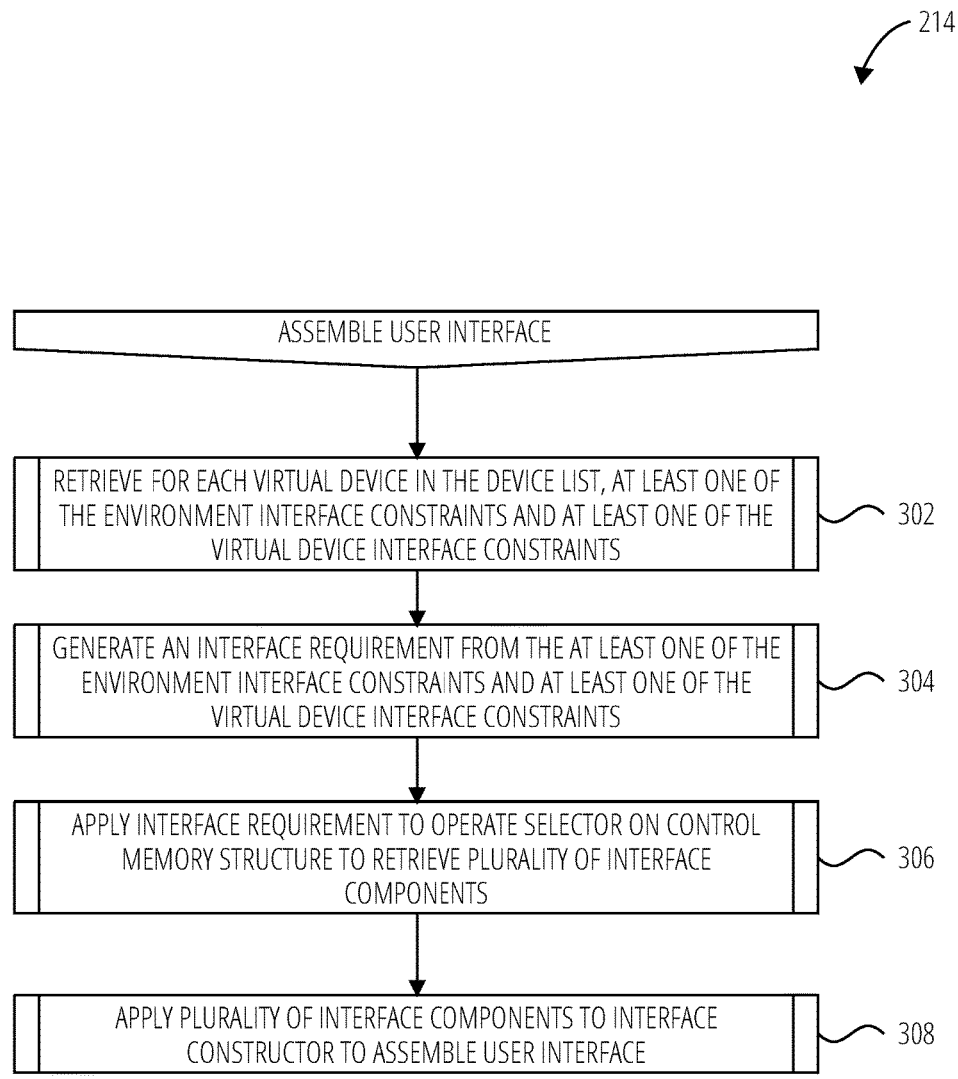
FIG. 3 illustrates an embodiment of a process for assembling a user interface 214.

FIG. 3 illustrates an embodiment of a process for assembling a user interface 214. In subroutine block 302, process for assembling a user interface 214 retrieves at least one of the environment interface constraints and at least one of the device interface constraints for each virtual device in the device list. In subroutine block 304 process for assembling a user interface 214 generates an interface requirement from at least one of the environment interface constraints and at least one of the device interface constraints. In subroutine block 306 process for generating installation details 216 applies the interface requirement to operate a selector on the control memory structure to retrieve a plurality of interface components. In subroutine block 308, process for generating installation details 216 applies the plurality of interface components to an interface constructor to assemble the user interface.

Figure 4:
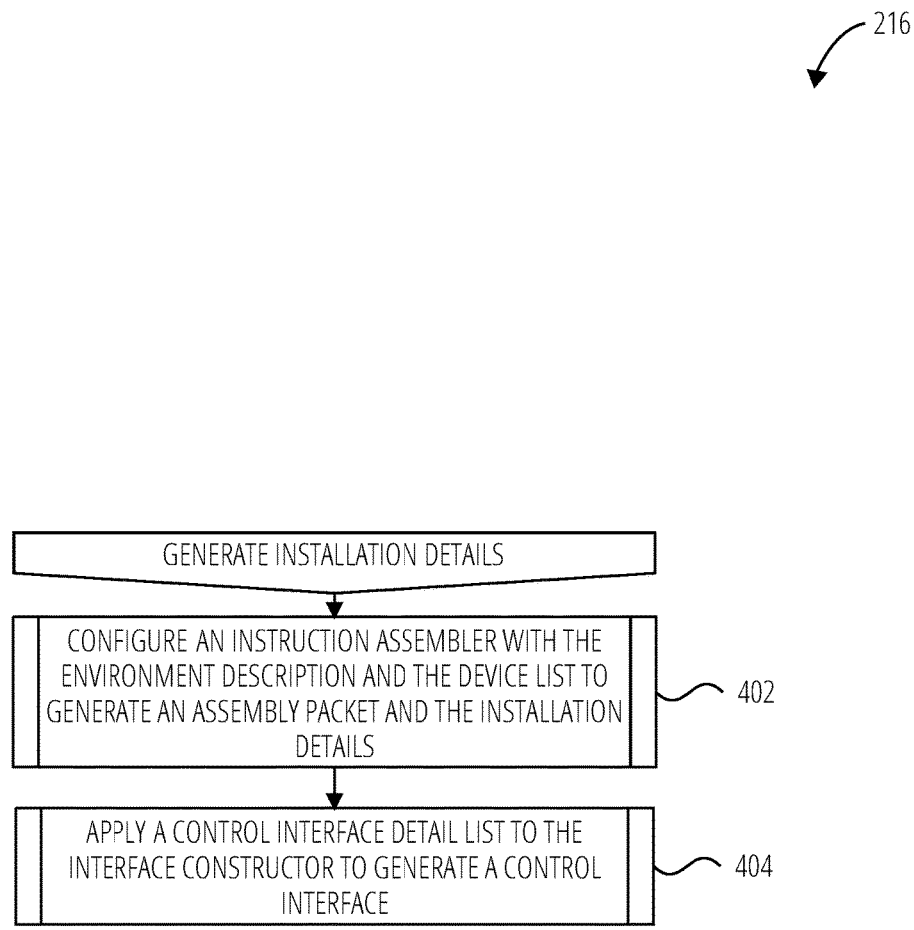
FIG. 4 illustrates an embodiment of a process for generating installation details 216.

FIG. 4 illustrates an embodiment of a process for generating installation details 216. In subroutine block 402 process for generating installation details 216 configures an instruction assembler with the environment description and device list to generate an assembly packet and installation details. In subroutine block 404, process for generating installation details 216 applies a control interface detail list to the interface constructor to generate a control interface.

Figure 5:
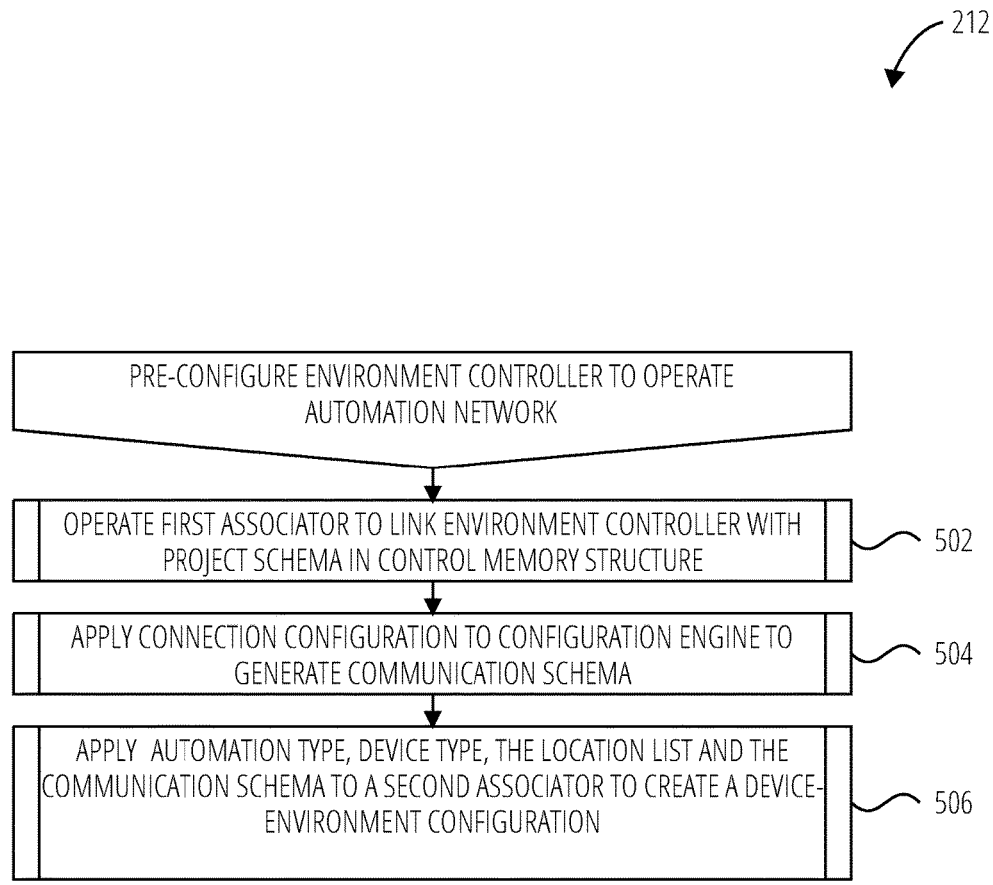
FIG. 5 illustrates an embodiment of a process to pre-configure environment controller to operate automation network 212

FIG. 5 illustrates an embodiment of a process to pre-configure environment controller to operate automation network 212. In subroutine block 502, process to pre-configure environment controller to operate automation network 212 operates a first associator to link the environment controller with the project schema in the control memory structure. In subroutine block 504, process to pre-configure environment controller to operate automation network 212 applies the connection configuration to a configuration engine to generate a communication schema. In subroutine block 506, process to pre-configure environment controller to operate automation network 212 applies the automation type, device type, the location list and the communication schema to a second associator to create a device-environment configuration.

Figure 6:
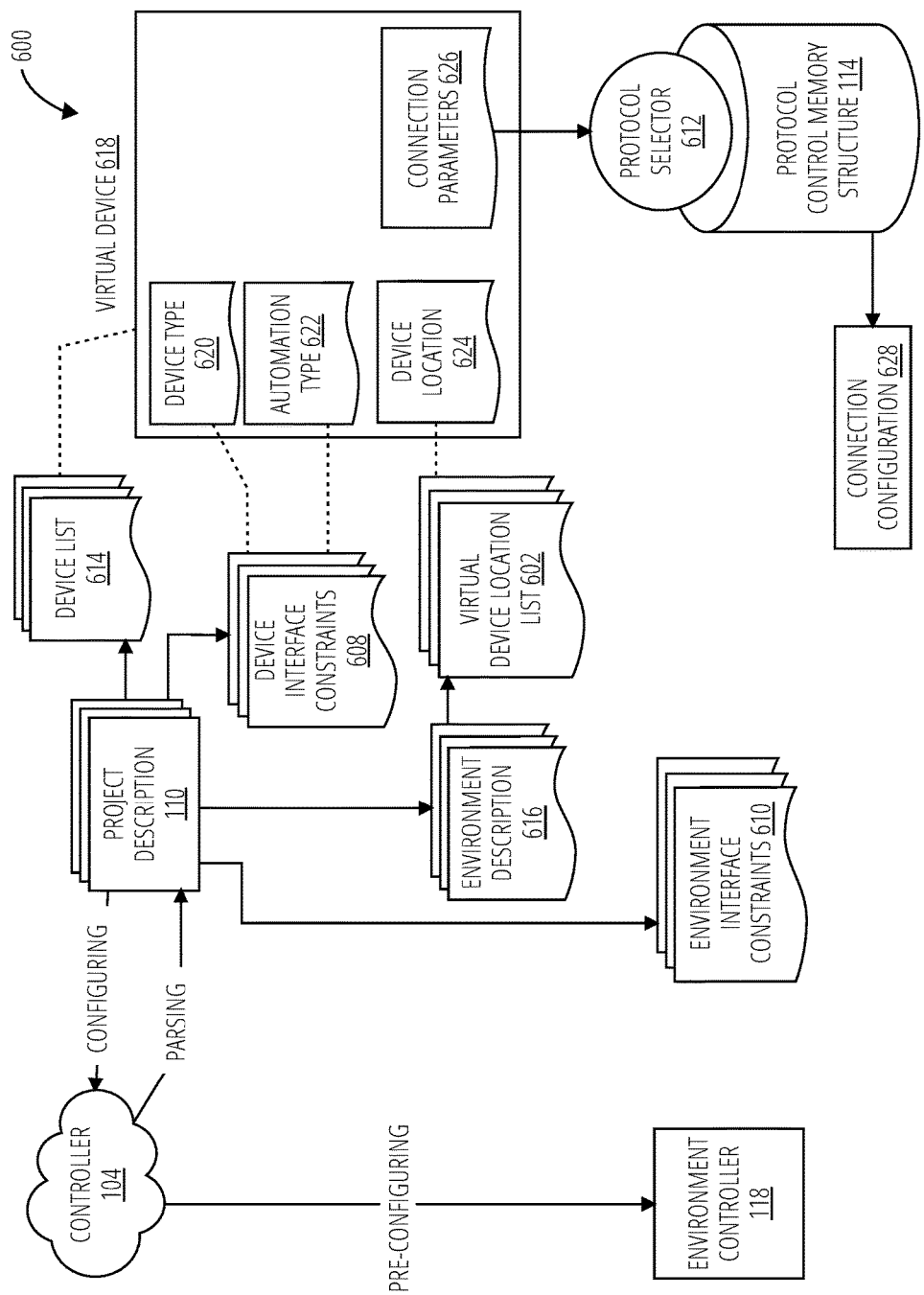
FIG. 6 illustrates an embodiment of a subsystem of a system for configuring an environmental controller 600.

FIG. 6 illustrates an aspect of an embodiment of subsystem of a system for configuring an environmental controller 600.

The subsystem of a system for configuring an environmental controller 600 comprises project description 110, device list 614, protocol selector 612, protocol control memory structure 114, connection configuration 628, environment controller 118, and controller 104.

The project description 110 comprises the device interface constraints 608, the environment description 616 and the environment interface constraints 610. The device interface constraints 608 comprises the device type 620 and the automation type 622.

Project description 110 further comprises device interface constraints 608, environment description 616, environment interface constraints 610, and device list 614. Environment description 616 further comprises virtual device location list 602. Device list 614 further comprises at least one virtual device 618. Virtual device 618 further comprises device type 620, automation type 622, device location 624, and connection parameters 626.

The subsystem of a system for configuring an environmental controller 600 may be operated in accordance with the processes outlined in FIG. 2, FIG. 3, FIG. 4, and FIG. 5.

Figure 7:
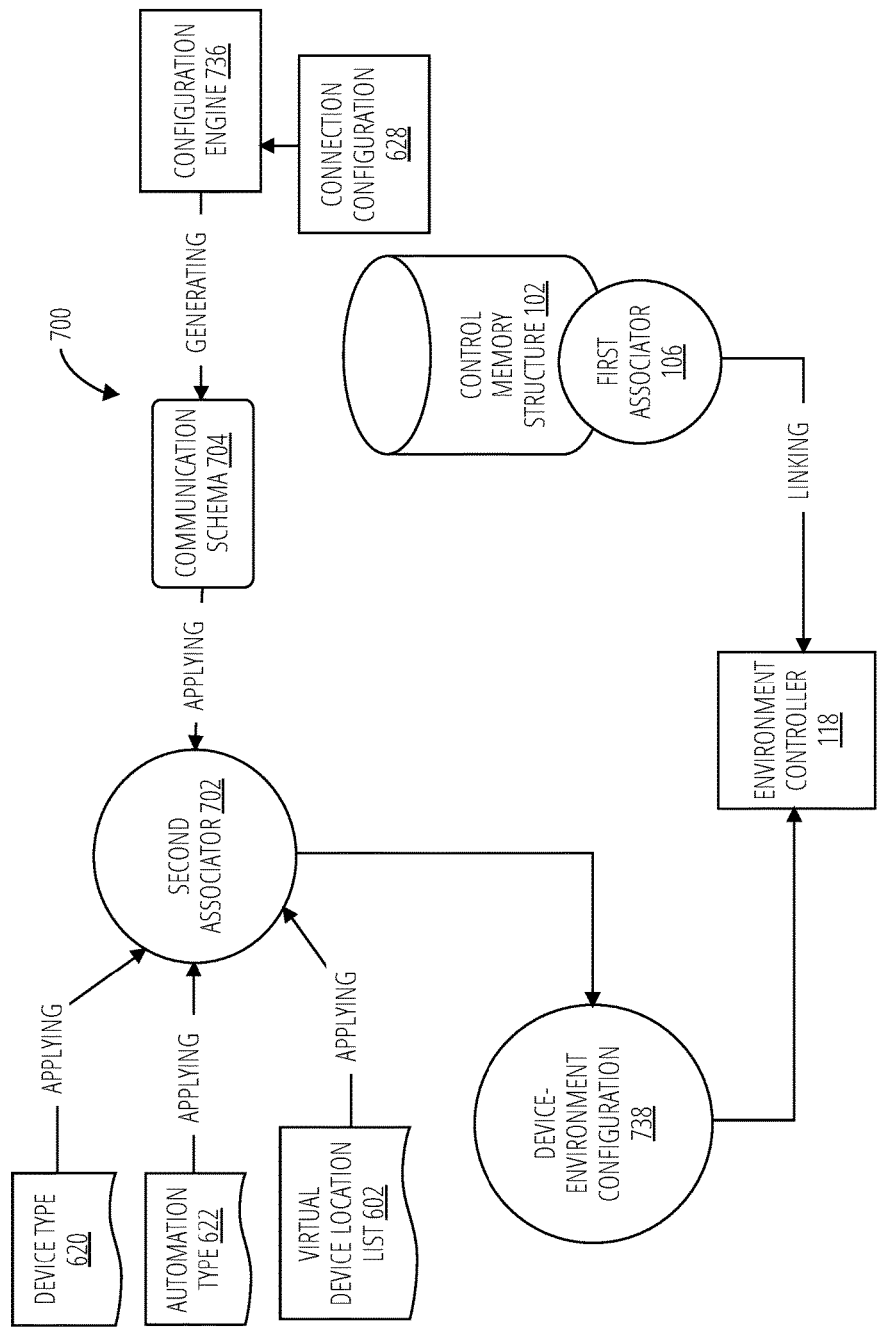
FIG. 7 illustrates an embodiment of a subsystem of a system for configuring an environmental controller 700.

FIG. 7 illustrates an embodiment of subsystem of a system for configuring an environmental controller 700.

The subsystem of a system for configuring an environmental controller 700 comprises device type 620, automation type 622, virtual device location list 602, second associator 702, communication schema 704, configuration engine 736, connection configuration 628, device-environment configuration 738, environment controller 118, first associator 106, and control memory structure 102.

The subsystem of a system for configuring an environmental controller 700 may be operated in accordance with the processes outlined in FIG. 2, FIG. 3, FIG. 4, and FIG. 5.

Figure 8:
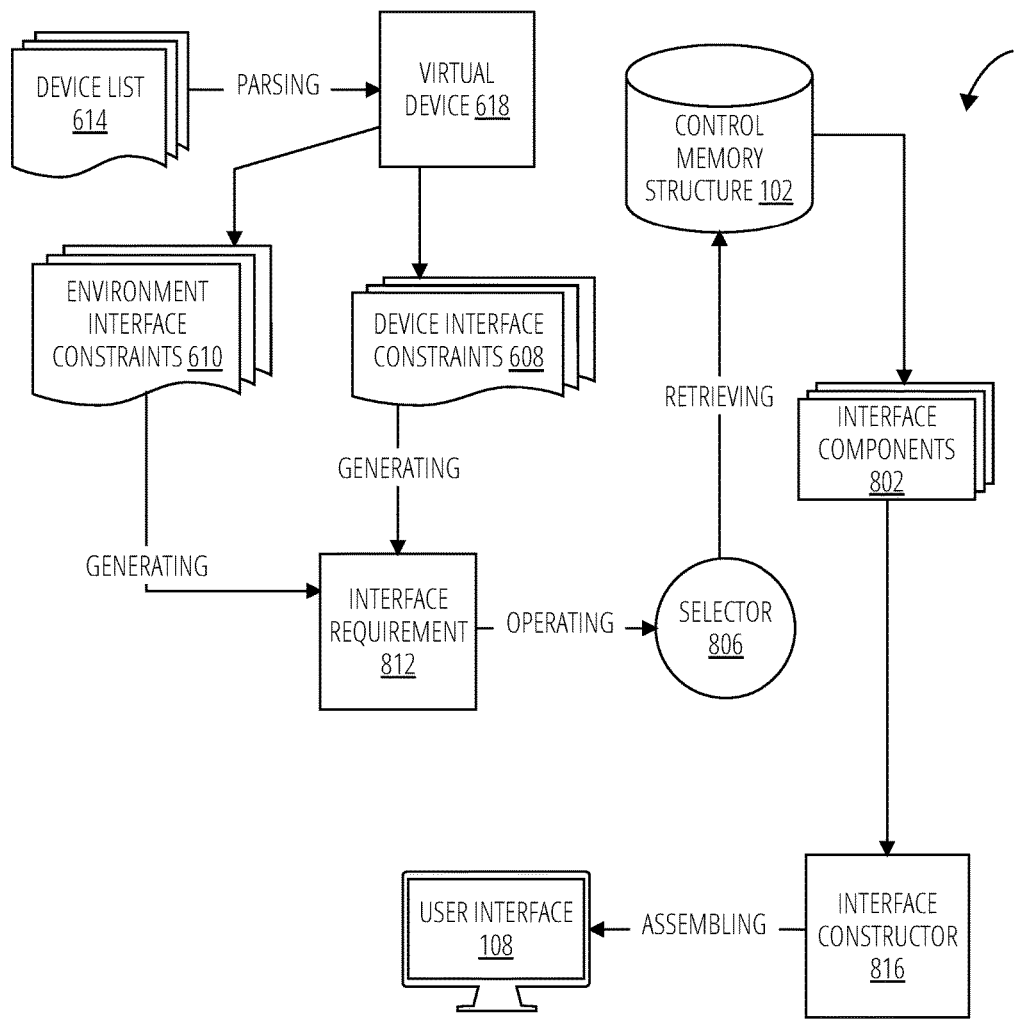
FIG. 8 illustrates an embodiment of a subsystem of a system for configuring an environmental controller 800.

FIG. 8 illustrates an embodiment of subsystem of a system for configuring an environmental controller 800.

Subsystem of a system for configuring an environmental controller 800 comprises device list 614, interface requirement 812, selector 806, control memory structure 102, interface components 802, interface constructor 816, user interface 108.

Device list 614 further comprises at least one virtual device 618. Virtual device 618 further comprises environment interface constraints 610, and device interface constraints 608.

The subsystem of a system for configuring an environmental controller 800 may be operated in accordance with the processes outlined in FIG. 2, FIG. 3, FIG. 4, and FIG. 5.

Figure 9:
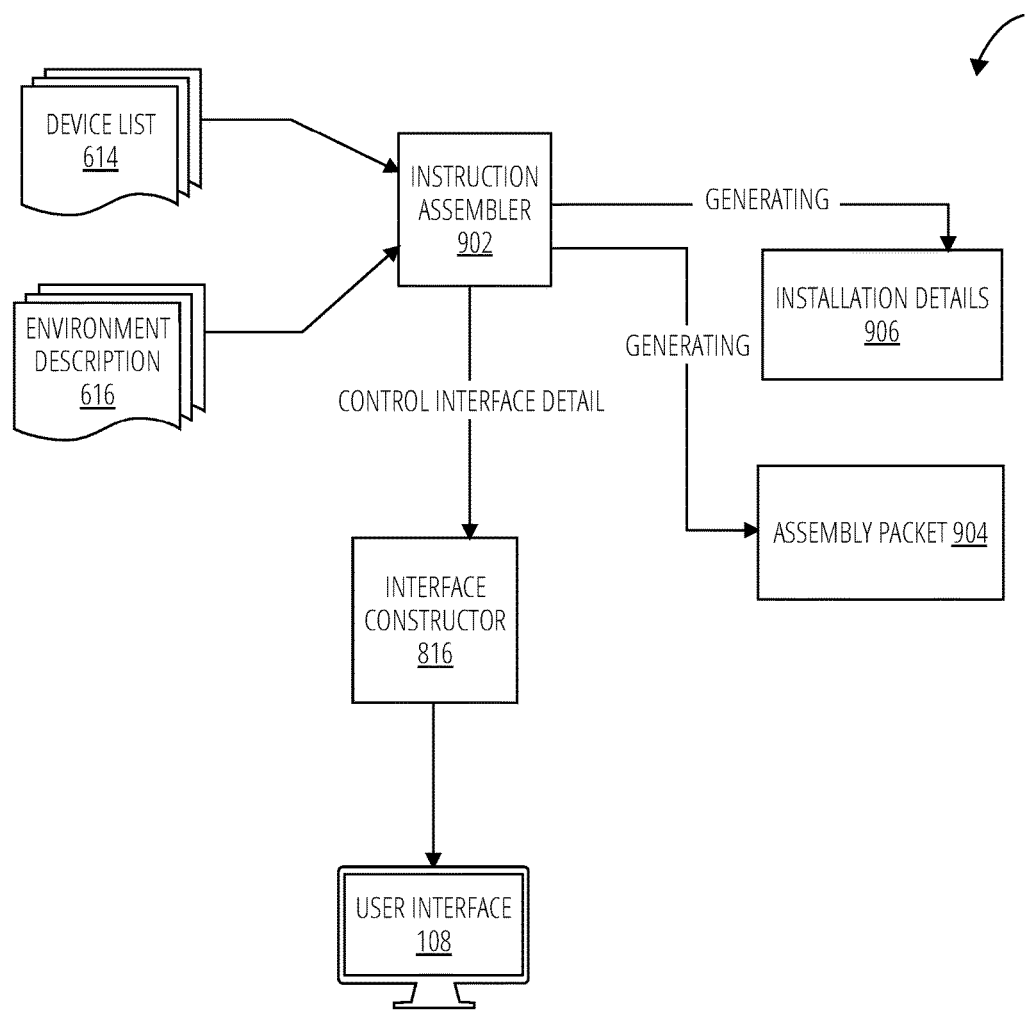
FIG. 9 illustrates an embodiment of a subsystem of a system for configuring an environmental controller 900.

FIG. 9 illustrates an aspect of an embodiment of subsystem of a system for configuring an environmental controller 900.

The subsystem of a system for configuring an environmental controller 900 comprises device list 614, environment description 616, instruction assembler 902, interface constructor 816, user interface 108, installation details 906, and assembly packet 904.

The subsystem of a system for configuring an environmental controller 900 may be operated in accordance with the processes outlined in FIG. 2, FIG. 3, FIG. 4, and FIG. 5.

Figure 10:
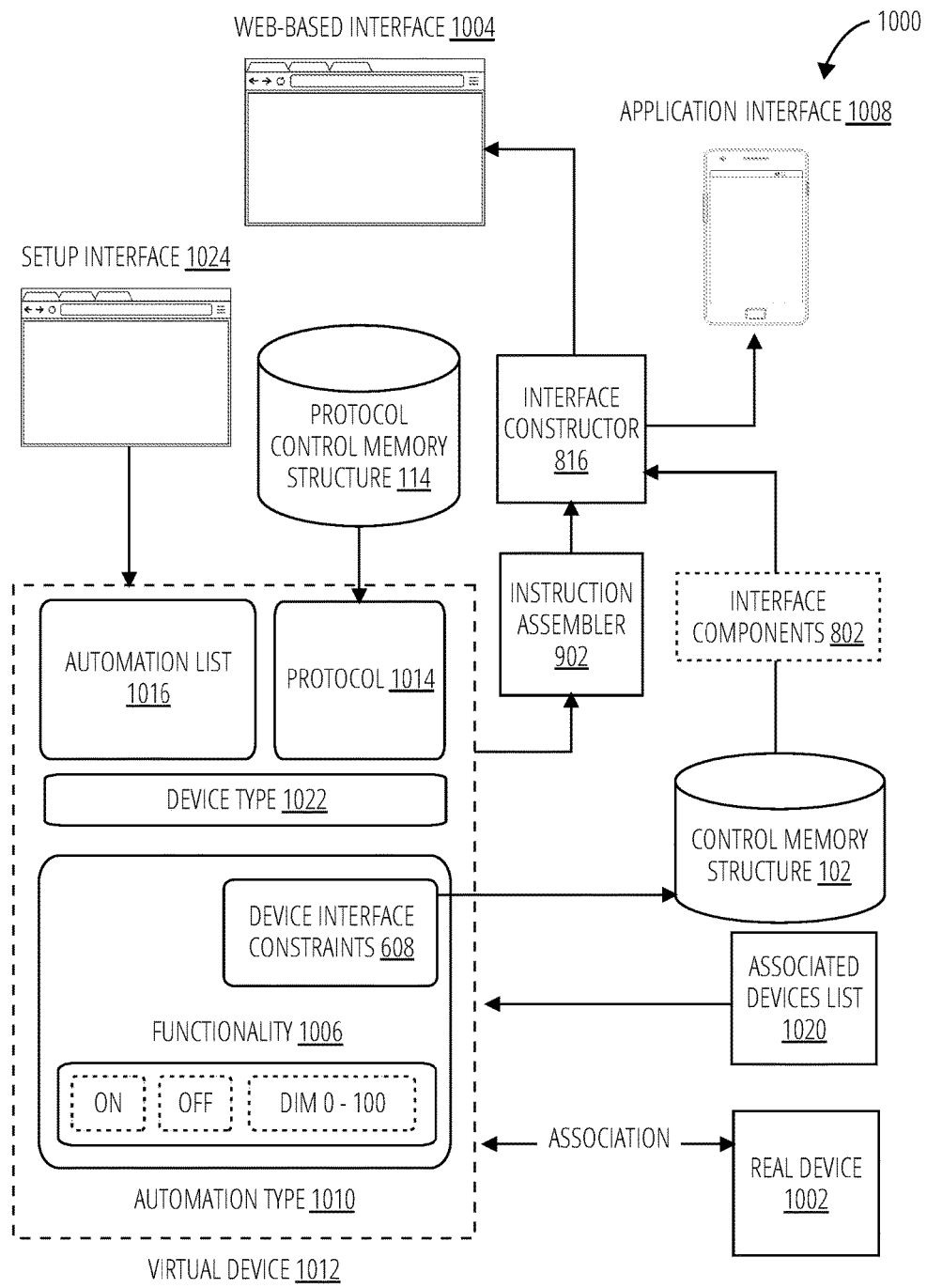
FIG. 10 illustrates an embodiment system for configuring an environmental controller 1000.

FIG. 10 illustrates an embodiment of a system for configuring an environmental controller 1000.

The system for configuring an environmental controller 1000 comprises a control memory structure 102, a protocol control memory structure 114, an interface components 802, an interface constructor 816, an instruction assembler 902, a real device 1002, a web-based interface 1004, an application interface 1008, an automation type 1010, a virtual device 1012, a protocol 1014, an associated devices list 1020, and a setup interface 1024.

The virtual device 1012 may further comprise a automation list 1016, a protocol 1014, a device type 1022, and an automation type 1010.

The automation type 1010 may further comprise functionality 1006 and device interface constraints 608.

Assembling a user interface may be accomplished utilizing device interface constraints 608 and instruction assembler 902 to configure an interface constructor 816 to assemble the user interfaces on the web-based interface 1004 and the 1008.

Generating an assembly packet 904 may be done with the instruction assembler 902 configuring an interface constructor 816 to construct interfaces on the application interface 1008 and the web-based interface 1004.

There may be multiple levels of automation classification, the automation type 1010 may comprise additional functionality 1006 which may denote the specific actions a device may perform.

The protocol 1014 from the protocol control memory structure 114 may be associated with the virtual device 1012.

Creating a device-environment configuration 738 may further comprise mapping the virtual device 1012 to a real device 1002, to create an association.

A setup interface 1024 may be used to configure the controller 104 with a project description 110, further comprising a virtual device 1012.

The system for configuring an environmental controller 1000 may be operated in accordance with the processes outlined in FIG. 2, FIG. 3, FIG. 4, and FIG. 5.

Figure 11:
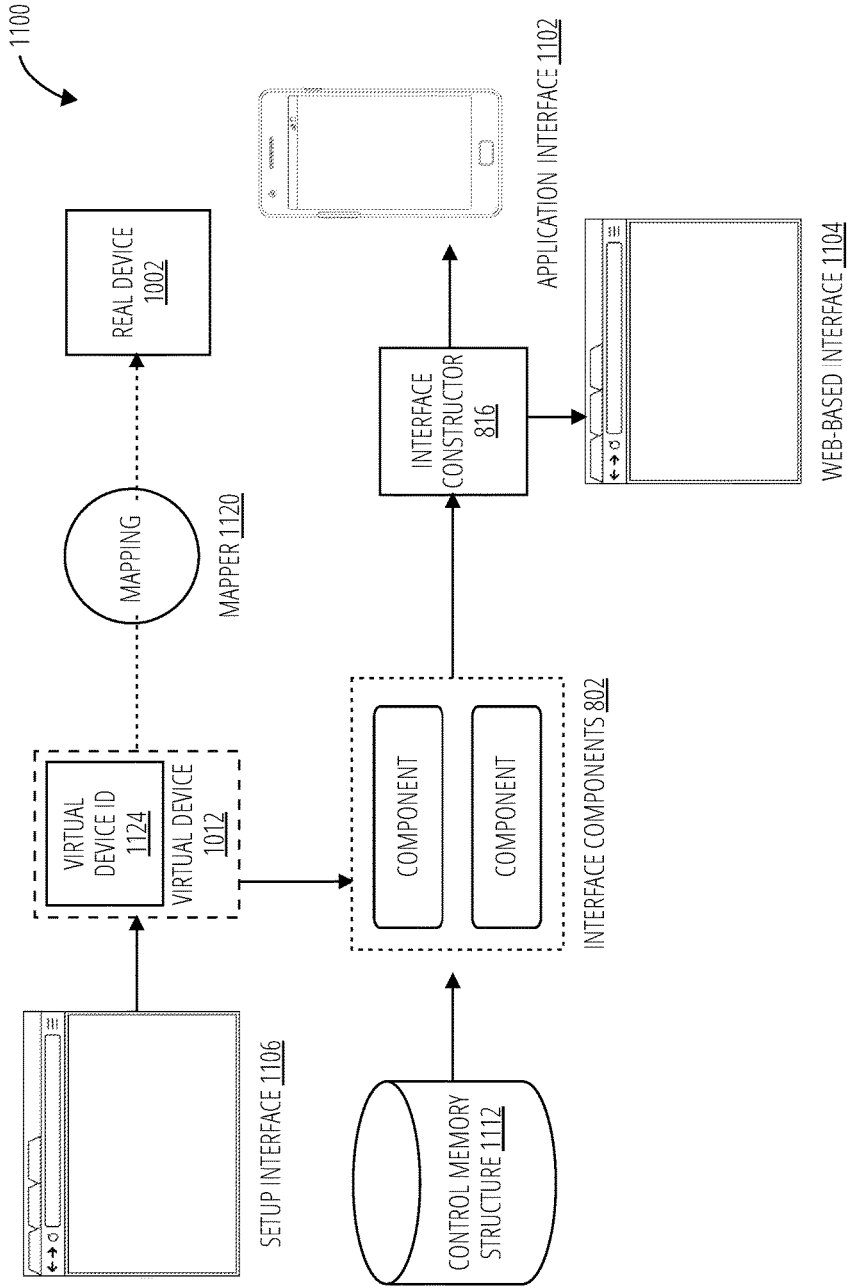
FIG. 11 illustrates an embodiment of a system for configuring an environmental controller 1100.
Figure 12:
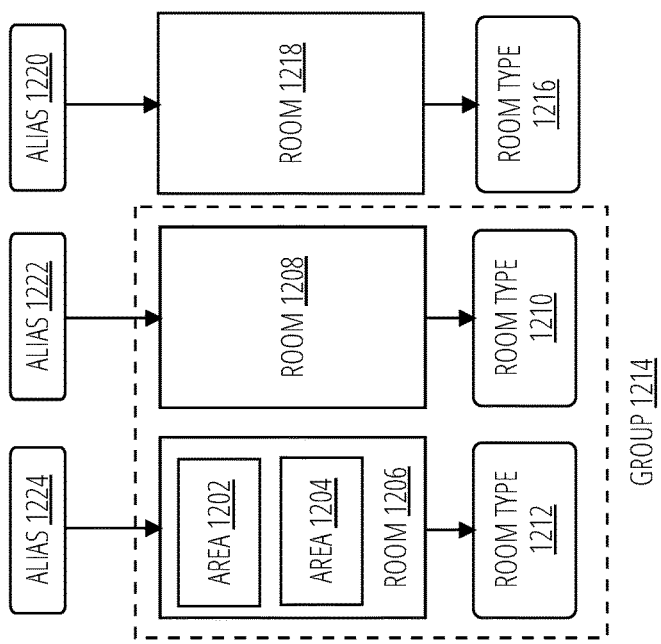
FIG. 12 illustrates an embodiment of an environment description 1200.

FIG. 11 illustrates an embodiment of a system for configuring an environmental controller 1100.

The system for configuring an environmental controller 1100 comprises an interface components 802, an interface constructor 816, a real device 1002, a virtual device 1012, an application interface 1102, a web-based interface 1104, a setup interface 1106, a control memory structure 1112, a mapper 1120, and a virtual device id 1124.

The selector 806 may select the interface components 802 from the automation network 112 and configure the interface constructor 816 to assemble the application interface 1102 and the web-based interface 1104. Creating a device-environment configuration 738 may comprise mapping the virtual device 1012 to a real device 1002, for example, this may be a virtual air conditioner being mapped to a physical air conditioner in a home.

The system for configuring an environmental controller 1100 may be operated in accordance with the processes outlined in FIG. 2, FIG. 3, FIG. 4, and FIG. 5.

Referring to figure environment description 1200, comprises a room 1206, a room 1208, a room type 1210, a room type 1212, a group 1214, a room type 1216, a room 1218, an alias 1220, an alias 1222, and an alias 1224.

The room 1206 further comprises an area 1202, and an area 1204.

The alias 1224 is associated with the room 1206, the room 1206 is associated with the room type 1212, the alias 1222 is associated with the room 1208, the room type 1210 is associated with the room type 1210. The group 1214 may group the room 1208 with the room 1206 based on shared attributes of the rooms. The room attributes may comprise the room's absolute location or location relative to other rooms. The group 1214 may provide context to the system to allow for additional configuration of automation tasks.

The environment description 1200 may be operated in accordance with the processes outlined in FIG. 2, FIG. 3, FIG. 4, and FIG. 5.

Figure 13:
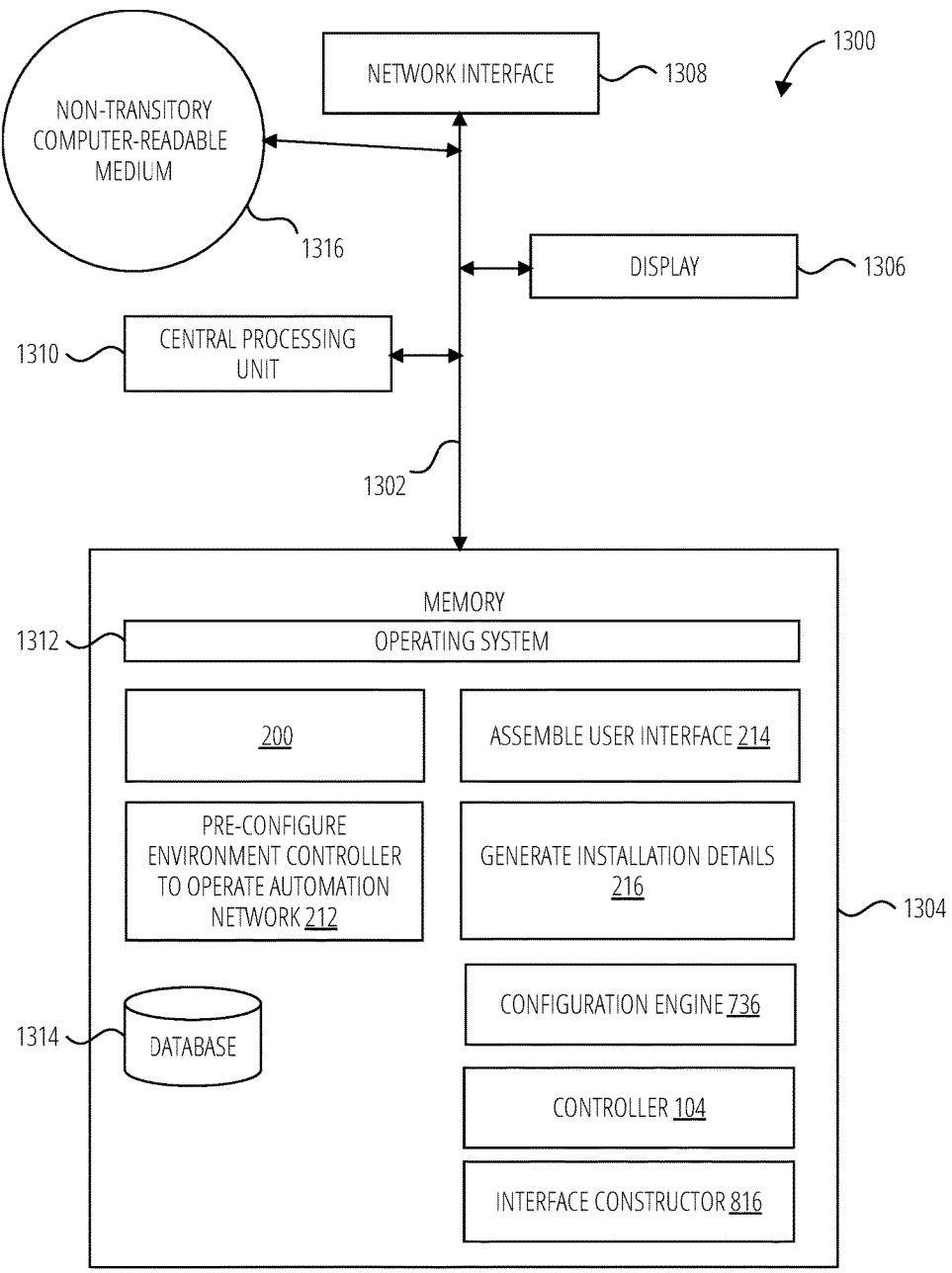
FIG. 13 illustrates a system 1300 in accordance with one embodiment.

FIG. 13 illustrates several components of an exemplary system 1300 in accordance with one embodiment. In various embodiments, system 1300 may include a desktop PC, server, workstation, mobile phone, laptop, tablet, set-top box, appliance, or other computing device that is capable of performing operations such as those described herein. In some embodiments, system 1300 may include many more components than those shown in FIG. 13. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1300 may comprise one or more physical and/or logical devices that collectively provide the functionalities described herein. In some embodiments, system 1300 may comprise one or more replicated and/or distributed physical or logical devices.

In some embodiments, system 1300 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1300 includes a bus 1302 interconnecting several components including a network interface 1308, a display 1306, a central processing unit 1310, and a memory 1304.

Memory 1304 generally comprises a random access memory ("RAM") and permanent non-transitory mass storage device, such as a hard disk drive or solid-state drive. Memory 1304 stores an operating system 1312.

These and other software components may be loaded into memory 1304 of system 1300 using a drive mechanism (not shown) associated with a non-transitory computer-readable medium 1316, such as a floppy disc, tape, DVD/CD-ROM drive, memory card, or the like.

Memory 1304 also includes database 1314. In some embodiments, system 1300 may communicate with database 1314 via network interface 1308, a storage area network ("SAN"), a high-speed serial bus, and/or via the other suitable communication technology.

In some embodiments, database 1314 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method comprising:
    configuring a controller with a project description to generate a project schema and saving the project schema in a control memory structure;
    parsing the project description into a device list, an environment description, at least one of an environment interface constraint, and at least one of a device interface constraint;
    parsing each virtual device in the device list into a device type, automation type, device location and connection parameters;
    applying the connection parameters to operate a protocol selector on a protocol control memory structure to select a plurality of protocols and associate each of the protocols with a virtual device in the device list and generate a connection configuration;
    parsing the environment description into a location list comprising a plurality of environment locations;
    pre-configuring an environment controller to operate an automation network comprising:
        operating a first associator to link the environment controller with the project schema in the control memory structure;
        applying the connection configuration to a configuration engine to generate a communication schema; and
        applying the automation type, the device type, the location list and the communication schema to a second associator to create a device-environment configuration;
    assembling a user interface comprising:
        retrieving, for each virtual device in the device list, at least one of the environment interface constraints and at least one of the device interface constraints;
        generating an interface requirement from the at least one of the environment interface constraints and at least one of the device interface constraints;
        applying the interface requirement to operate a selector on the control memory structure to retrieve a plurality of interface components; and
        applying the plurality of interface components to an interface constructor to assemble the user interface;
    generating installation details comprising:
        configuring an instruction assembler with the environment description and the device list to generate an assembly packet and the installation details; and
    applying a control interface detail list to the interface constructor to generate a control interface.

2. The method of claim 1 pre-configuring the environment controller further comprises executing initial tests of connected devices.

3. The method of claim 1 the project description comprising at least one of:
    building location;
    building configuration;
    devices used; and
    device attributes.

4. The method of claim 1 wherein generating the assembly packet and the installation details further comprises at least one of:
    querying an environment controller specification list with the project description to select the environment controller; and applying environment controller attributes and device attributes list to a project schematic, electrical maps and a materials list.

5. The method of claim 1 wherein the environment description comprises an environment configuration and environment attributes.

6. A computing apparatus, the computing apparatus comprising:
a processor; and
a memory storing instructions that, when executed by the processor, configure the apparatus to:
  configure a controller with a project description to generate a project schema and saving the project schema in a control memory structure;
  parse the project description into a device list and an environment description, at least one of a environment interface constraint, and at least one of a device interface constraint;
  parse each virtual device in the device list into a device type, automation type, device location and connection parameters;
  apply the connection parameters to operate a protocol selector on a protocol control memory structure to select a plurality of protocols and associate each of the protocols with a virtual device in the device list and generate a connection configuration;
  parse the environment description into a location list comprising a plurality of environment locations;
  pre-configure an environment controller to operate an automation network comprising:
    operate a first associator to link the environment controller with the project schema in the control memory structure;
    apply the connection configuration to a configuration engine to generate a communication schema; and
    apply the automation type, the device type, the location list and the communication schema to a second associator to create a device-environment configuration;
  assemble a user interface comprising:
    retrieve, for each virtual device in the device list, at least one of the environment interface constraints and at least one of the device interface constraints;
    generate an interface requirement from the at least one of the environment interface constraints and at least one of the device interface constraints;
    apply the interface requirement to operate a selector on the control memory structure to retrieve a plurality of interface components; and
    apply the plurality of interface components to an interface constructor to assemble the user interface;
  generate installation details comprising:
    configure an instruction assembler with the environment description and the device list to generate an assembly packet and the installation details; and
    apply a control interface detail list to the interface constructor to generate a control interface.

7. The computing apparatus of claim 6 pre-configure the environment controller further comprises executing initial tests of connected devices.

8. The computing apparatus of claim 6 the project description comprising at least one of:
build location;
build configuration;
devices used; and
device attributes.

9. The computing apparatus of claim 6 wherein generating the assembly packet and the installation details further comprises at least one of:
query an environment controller specification list with the project description to select the environment controller; and
apply environment controller attributes and device attributes list to a project schematic, electrical maps and a materials list.

10. The computing apparatus of claim 6 wherein the environment description comprises an environment configuration and environment attributes.

* * * * *